US010288234B1

(12) United States Patent
Whelan et al.

(10) Patent No.: US 10,288,234 B1
(45) Date of Patent: May 14, 2019

(54) HAND-HELD UV STIMULATOR

(71) Applicant: BAE SYSTEMS Information and Electronic Systems Integration Inc., Nashua, NH (US)

(72) Inventors: Jenna M. Whelan, Windham, NH (US); Fernando Hernandez, Epping, NH (US); Jared Kondratuk, Amherst, NH (US); Denise X. Zhang, Sudbury, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/182,853

(22) Filed: Nov. 7, 2018

(51) Int. Cl.
| | |
|---|---|
| *G01J 5/10* | (2006.01) |
| *F21L 14/02* | (2006.01) |
| *G01J 1/42* | (2006.01) |
| *F21V 23/04* | (2006.01) |
| *F21V 23/00* | (2015.01) |
| *G01T 1/208* | (2006.01) |

(52) U.S. Cl.
CPC .......... *F21L 14/023* (2013.01); *F21V 23/007* (2013.01); *F21V 23/0414* (2013.01); *G01J 1/42* (2013.01); *G01J 5/10* (2013.01); *G01T 1/208* (2013.01)

(58) Field of Classification Search
CPC .. F21L 14/023; F21V 23/007; F21V 23/0414; G01J 1/42; G01J 5/10; G01T 1/208
USPC .......................................................... 250/372
See application file for complete search history.

(56) References Cited

U.S. PATENT DOCUMENTS

| | | | | |
|---|---|---|---|---|
| 9,138,595 | B2* | 9/2015 | Savage | A61M 21/00 |
| 9,851,082 | B2* | 12/2017 | Thompson | F21L 4/025 |
| 2003/0076281 | A1* | 4/2003 | Morgan | F24C 7/004 |
| | | | | 345/44 |
| 2006/0133073 | A1* | 6/2006 | Nakata | H01L 25/167 |
| | | | | 362/192 |
| 2008/0007498 | A1* | 1/2008 | Yu | G09F 9/33 |
| | | | | 345/82 |
| 2008/0169423 | A1* | 7/2008 | Betschart | G01J 1/04 |
| | | | | 250/372 |
| 2011/0026012 | A1* | 2/2011 | Barth | F41G 7/004 |
| | | | | 356/51 |
| 2011/0062873 | A1* | 3/2011 | Gall | F21S 8/006 |
| | | | | 315/153 |
| 2014/0275843 | A1* | 9/2014 | Piccirillo | A61B 5/14556 |
| | | | | 600/301 |
| 2015/0035440 | A1* | 2/2015 | Spero | B60Q 1/04 |
| | | | | 315/153 |
| 2018/0014375 | A1* | 1/2018 | Dupras | H05B 33/086 |
| 2018/0084733 | A1* | 3/2018 | Adams | H05B 33/0827 |
| 2018/0183209 | A1* | 6/2018 | Nerheim | G01J 1/18 |
| 2018/0364371 | A1* | 12/2018 | Hossbach | G01T 1/208 |

\* cited by examiner

*Primary Examiner* — Taeho Jo
(74) *Attorney, Agent, or Firm* — Davis & Bujold, PLLC

(57) ABSTRACT

A system and method for stimulating light sensors (e.g., UV) using a hand-held stimulator. The hand-held stimulator is portable and configurable to store a plurality of routines comprising various light signatures. In some cases, the signature is a threat signature (e.g., missile, RPG, and/or gunfire) and the stimulator is used as part of system integration, field and flight line, and/or lab testing for systems utilizing light sensors.

11 Claims, 5 Drawing Sheets

HAND-HELD UV STIMULATOR

STATEMENT OF GOVERNMENT INTEREST

This disclosure was made with United States Government support under Contract No. W58RGZ-13-D-0245-T0-000 awarded by the Department of the Army of the United States. The United States Government has certain rights in this disclosure.

FIELD OF THE DISCLOSURE

The present disclosure relates to the use of ultraviolet sensors and more particularly to a hand-held ultraviolet (UV) stimulator for testing systems that utilize UV sensors.

BACKGROUND OF THE DISCLOSURE

During software integration, lab testing, field and flight line testing, it is often useful to stimulate ultraviolet (UV) sensors with various UV signatures, but currently there are no known known UV stimulators available that are able to provide such a simulation of these signatures as some of these signatures are required to move across a sensor's field of view (FOV). Wherefore it is an object of the present disclosure to overcome the above-mentioned shortcomings and drawbacks associated with the conventional systems using ultraviolet (UV) sensors to provide for testing of such systems with a UV stimulator.

SUMMARY OF THE DISCLOSURE

One aspect of the present disclosure is a hand-held light sensor stimulator, comprising: a handle having a trigger; a hollow cylindrical support configured to support a plurality of arcuate light source mounts, each light source mount housing a light source; and a control box attached to the handle and to the hollow support, the control box comprising: a power source and a memory for storing one or more routines used to operate a plurality of light sources; wherein each light source comprises a microcontroller for controlling the intensity and duration of light emitted from each light source according to the one or more routines stored in the memory of the light source stimulator.

One embodiment of the hand-held light sensor stimulator is wherein the light sources are UV sources.

Another embodiment of the hand-held light sensor stimulator further comprises indicator lights. In some cases, the hand-held light sensor stimulator further comprises a serial connection for use in uploading the one or more routines to the memory.

Yet another embodiment of the hand-held light sensor stimulator is wherein the one or more routines are used to operate the UV sources to replicate a threat signature for use in testing a system using UV sensors as part of system integration, field and/or flight line testing, and/or lab testing.

Another aspect of the present disclosure is a method of testing a light sensor system, comprising: providing a hand-held light sensor stimulator, comprising: a handle having a trigger; a hollow cylindrical support configured to support a plurality of arcuate light source mounts, each light source mount housing a light source; and a control box attached to the handle and to the hollow support, the control box comprising a power source and a memory for storing one or more routines used to operate a plurality of light sources; wherein each light source comprises a microcontroller for controlling the intensity and duration of light emitted from each light source according to the one or more routines stored in the memory of the light source stimulator; selecting one of the one or more routines using a selector switch; pointing the hand-held light sensor stimulator at a light sensor; positioning the hand-held light sensor stimulator within the field of view of the light sensor; and squeezing the trigger on the handle, thereby producing a sequence of light emissions from the plurality of light sources according to the routine selected.

One embodiment of the method of testing a light sensor system is wherein the light sources are UV sources.

Another embodiment of the method of testing a light sensor system further comprises uploading the one or more routines to the memory using a serial connection. In some cases, the method of testing a light sensor system further comprises collecting data from the sensor or a system comprising the sensor as part of system integration, field and/or flight line testing, and/or lab testing.

Still yet another embodiment of the method of testing a light sensor system is wherein the selected routine represents a threat signature. In some cases, the selected routine is a simulated signature mimicking movement across the sensor field of view without needing to move the hand-held light sensor stimulator.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
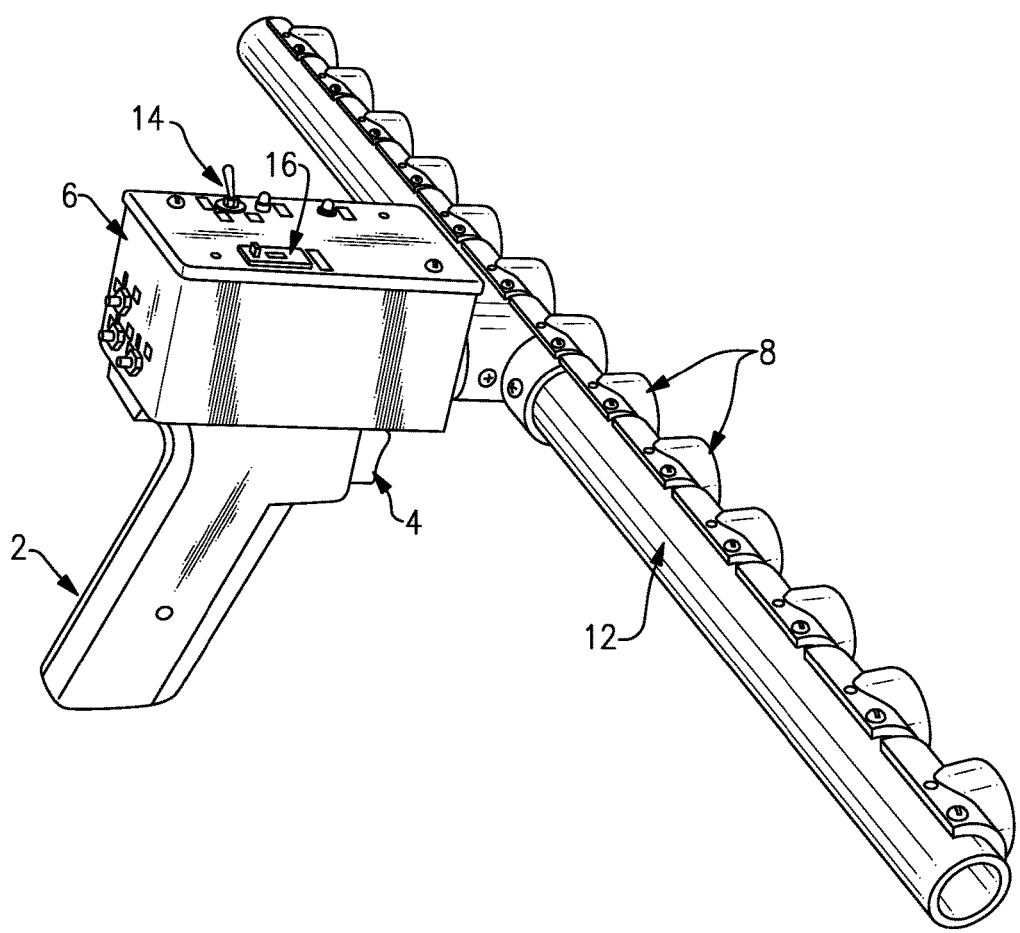
FIG. 1 shows a perspective view of one embodiment of a hand-held ultraviolet (UV) stimulator according to the principles of the present disclosure.

In one embodiment of the system, the UV stimulator is a hand-held device that is used to stimulate UV sensors. In some cases, the UV sensor is a standalone sensor and other times the UV sensor(s) are part of a larger system. In some cases the larger system may be useful in military and/or commercial applications.

In certain embodiments of the present disclosure, the UV energy can be user-defined in order to simulate various real-world UV signatures of interest. In some cases, these signatures may be used in threat detection and the like. Users are able to select different programs on the device depending on the application of interest. In certain embodiments, the hand-held stimulator allows for controlled/programmed spatial and temporal UV emissions for the purposes of stimulating UV sensors with different UV signatures. The system is useful for in-house lab testing, field testing, integration testing, and the like.

In one embodiment, a myriad of programs are possible with this device. In certain embodiments, eleven UV sources are located on the device, and any number of which can be selected to emit UV energy during a selected program. In some cases, the intensity of UV emission is customizable, the duration of UV emission is customizable, and the space between source emissions is customizable. In one embodiment, 16 programs are stored locally on the device. It is understood that there could be larger storage available for programs, and more or different light sources, if needed.

One embodiment of the hand-held UV stimulator of the present disclosure has eleven light sources in an array, each of which emit UV radiation at a programmed intensity. In some cases, fewer or more light sources are used; eleven was selected in one embodiment, in part, due to ease of portability while retaining sufficient complexity for wide-spread application. The UV sources are programmed via a microcontroller. The microcontroller firmware that programs the UV sources adjusts the intensity of the UV source, the duration of the signal waveform, and the delay between UV source turn-on (e.g., for pulses). The device itself can contain a plurality of pre-set programs. In one example there are sixteen different programs. In one embodiment, there is a dial on the hand-held device to select a program.

The lightweight, hand-held device is easily portable for use with in-lab software and systems integration testing, field testing, flight-line checks, and the like. In one embodiment, a modular design allows for more UV signatures to be added through a firmware update. The use of eleven programmable UV sources and the ability to change the intensity and duration allow for an infinite amount of designs for different UV signatures. This system is useful for any type of UV sensor stimulation. The sources can be programmed to simulate various different real-world sources that emit UV energy.

In one embodiment of the system LEDs are mounted to the device to signal when a UV source is emitting. This helps with proof of concept, but it is also useful for the user to validate proper operation of the device. In certain embodiments, a graphical user interface (GUI) allows a user to program particular UV emission routines from any of the (e.g., 1-11) UV sources. The program includes intensity, duration, and the like. If multiple sources are used, the spacing between signals may also be modified. In one case, up to sixteen programs are stored locally on the stimulator and the user can select a desired program on the handle of the device. Once a user selects the desired program, they pull the trigger and the one or more sources emit UV light. In some cases, visible LED lights turn on at the same time so the user can see which sources were triggered. It is understood that the device of the present disclosure is applicable to other wavelengths of radiation in addition to the ultraviolet range. In some cases, the device may be useful for SWIR, MWIR, LWIR, visible, and the like.

In one embodiment of the device of the present disclosure the device may be held up to a UV sensor and tested either alone or as part of a larger detection system such that the entire field of view (FOV) of the sensor is exposed to the device. In some cases, the device is not moved when triggering a sensor, it is typically held stationary (although it could move to simulate motion in some cases). Each of the plurality of UV sources is triggered individually from the microcontroller. The stimulator is placed within a predetermined field of view of the sensor then activated. The stimulator then steps through the selected program and commands each of the sources as programmed. In one embodiment, two emitters on the end of the device are illuminated in order to help discern spacing (distances between emitters) and codes (timing between emissions).

Referring to FIG. 1, a perspective view of one embodiment of a hand-held ultraviolet (UV) stimulator according to the principles of the present disclosure is shown. More specifically, the hand-held device has a handle 2 with a trigger 4, wherein the trigger is used to start and/or stop a routine/signature emitted by the device. In some cases, a control box 6, or the like comprises a processor, memory, a power source and the like. The control box is in electrical communication with a plurality of light sources (8), here UV sources, located along a horizontal support 12. In one embodiment, eleven light sources are located between two light sources located on opposing ends of the support 12. In one embodiment, all light sources 8 are identical sources and each has a UV emitter and microcontroller.

Still referring to FIG. 1, a power switch 14 is located on the device. In some cases, the power switch is located on the control box. In some cases, indicator lights are also present (See, FIG. 2). In one embodiment, a program selector 16 is located on the control box 6 for selection of the one or more pre-loaded programs stored on the device.

Figure 2:
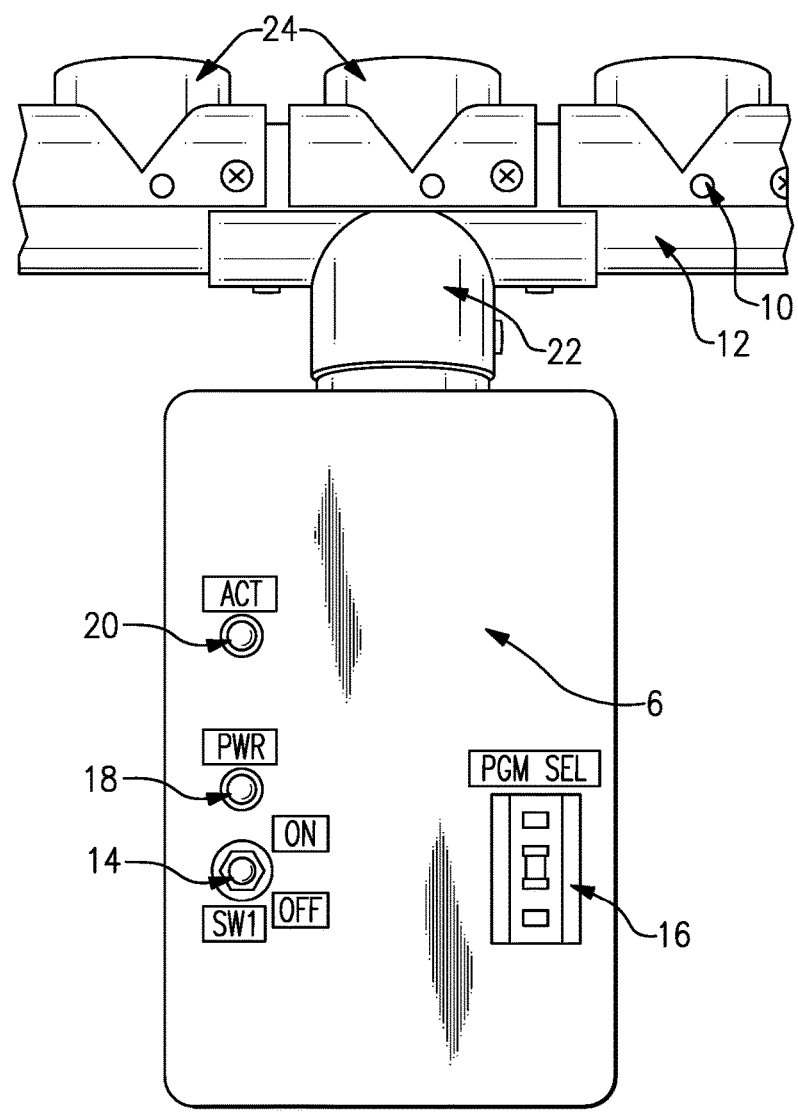
FIG. 2 shows a perspective view of a control box for one embodiment of a hand-held ultraviolet (UV) stimulator according to the principles of the present disclosure.

Referring to FIG. 2, a perspective view of a control box for one embodiment of a hand-held ultraviolet (UV) stimulator according to the principles of the present disclosure is shown. More specifically, a power switch 14 is shown with a power indicator light 18. A program selector switch 16 is also shown. In some cases, an actuator indicator 20 is illuminated to indicate when one of the light sources is emitting radiation. In certain embodiments indicator lights 10 are used as one per light source to indicate when a particular UV source is emitting radiation. In one embodiment of the hand-held device of the present disclosure, a horizontal support 12 is mounted to the control box 6 via a support mount 22. The support 12 is dimensioned to accommodate a plurality of light sources (e.g., UV), each mounted to the support 12 via a light source mount 24. In certain embodiments, modularity of the device provides for replacement of light sources.

Figure 3B:
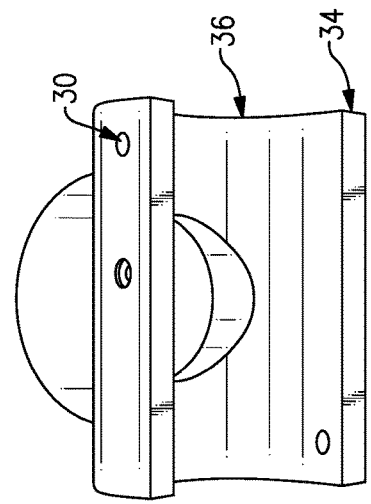
FIG. 3B shows a bottom perspective view of one embodiment of a light source mount according to the principles of the present disclosure.
Figure 3D:
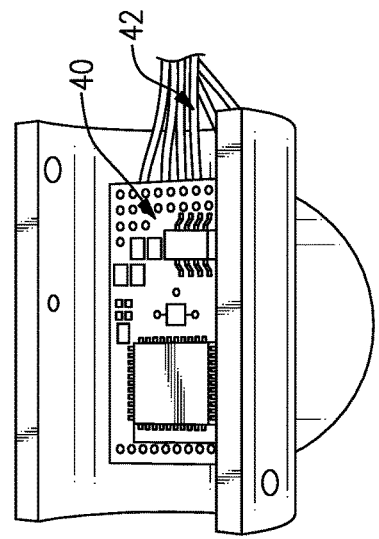
FIG. 3D shows a bottom perspective view of one embodiment of a light source mount with a light source module inserted according to the principles of the present disclosure.
Figure 3A:
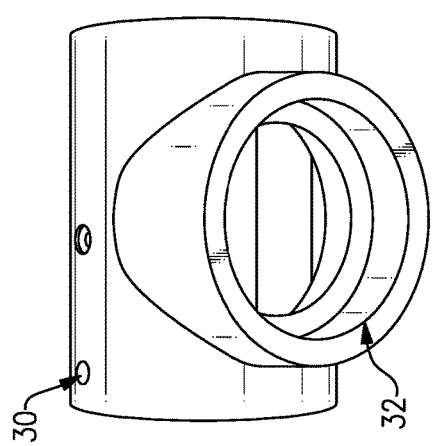
FIG. 3A shows a top perspective view of one embodiment of a light source mount according to the principles of the present disclosure.

Referring to FIG. 3A, a top perspective view of one embodiment of a light source mount according to the principles of the present disclosure is shown. More specifically, one embodiment of the light source mount is configured to attach to a cylindrical support (See, e.g. FIG. 1) via an arcuate shape. In some cases, the light source mount is fastened to the support using screws or the like. In this figure, predrilled holes are shown 30. The light source (not shown) is inserted into the light source mount and radiation is emitted out a front portion 32. In this embodiment, the front portion 32 is round and extends outward away from the base of the mount to accommodate electronics and the like.

Referring to FIG. 3B, a bottom perspective view of one embodiment of a light source mount according to the principles of the present disclosure is shown. More specifically, mounting holes 30 are shown in one or more of the free ends 34 of the actuate-shaped base 36 of the light source mount.

Figure 3C:
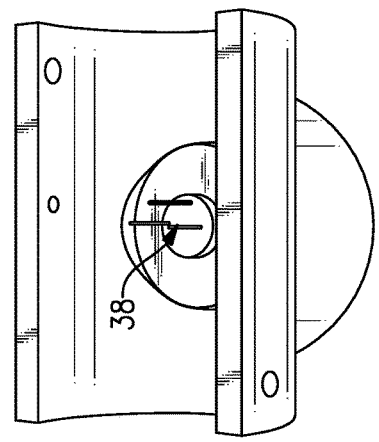
FIG. 3C shows a bottom perspective view of one embodiment of a light source mount with a light source inserted according to the principles of the present disclosure.

Referring to FIG. 3C, a bottom perspective view of one embodiment of a light source mount with a light source inserted according to the principles of the present disclosure is shown. More specifically, a light source 38 (e.g. an LED) is shown inserted through an opening in the light source mount. In one embodiment the arcuate shape of the mount and the cylindrical shape of the support provide adequate space for wiring and the like will retaining a relatively low profile.

Referring to FIG. 3D, a bottom perspective view of one embodiment of a light source mount with a light source module inserted according to the principles of the present disclosure is shown. More specifically, a PCB 40 is shown attached to a light source, which is inserted into the light source mount. The PCB contains a microcontroller and additional components necessary to control and drive the output of the connected UV source. The plurality of light sources is wired 42 to the control box and a power source (not shown).

Figure 4:
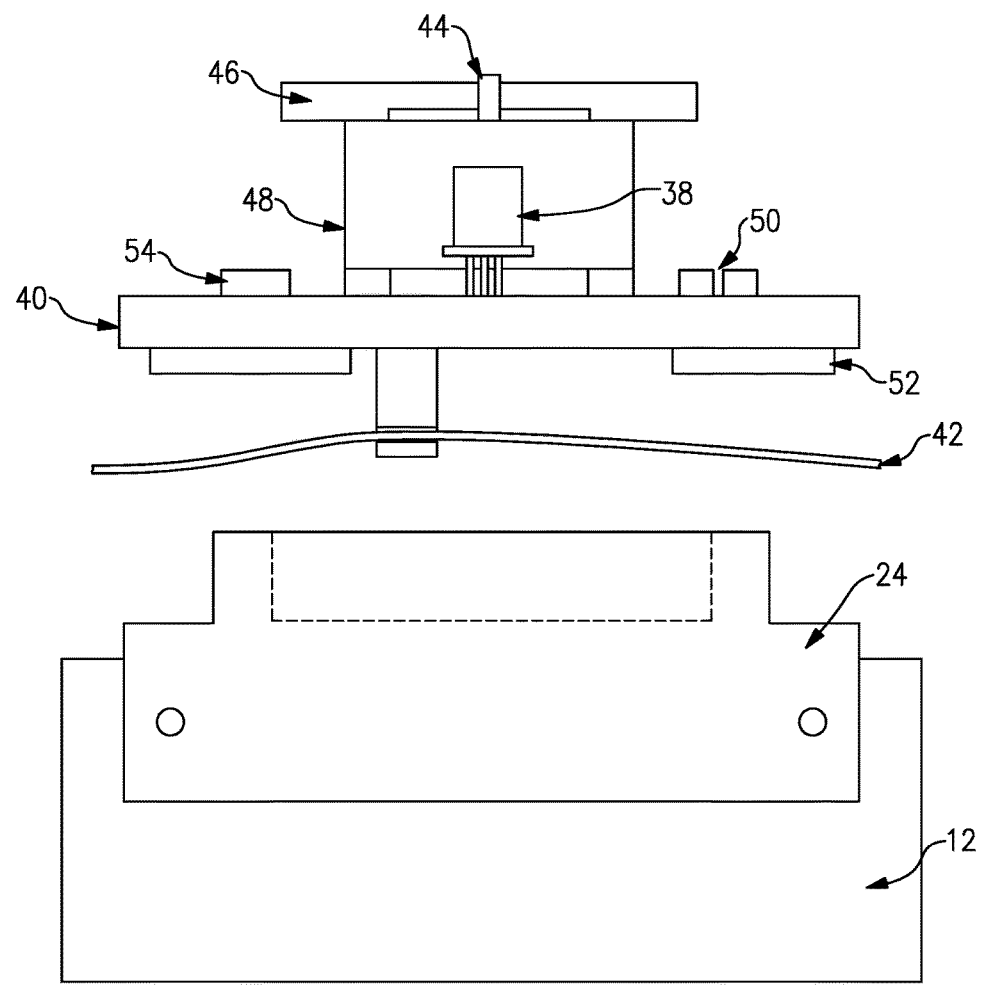
FIG. 4 is a diagrammatic cross-sectional view of one embodiment of a light source module according to the principles of the present disclosure.

Referring to FIG. 4, a diagrammatic cross-sectional view of one embodiment of a light source module according to the principles of the present disclosure is shown. More specifically, a portion of a tubular support 12 is shown with an arcuate light source mount 24 in the bottom of the figure. Above that, one embodiment of a light source module is shown. There, a light source 38 (e.g., an LED) is shown connected to a PCB 40 and electrical connection 42 (e.g., wires) are also shown. In one embodiment, a front cover 46 is mounted on a housing surrounding the LED. The front cover 46 comprises an aperture 44. In certain embodiments, the UV sensor module further comprises a microcontroller 54, a D/A converter 50, a serial driver 52, and various other discrete components.

Figure 5:
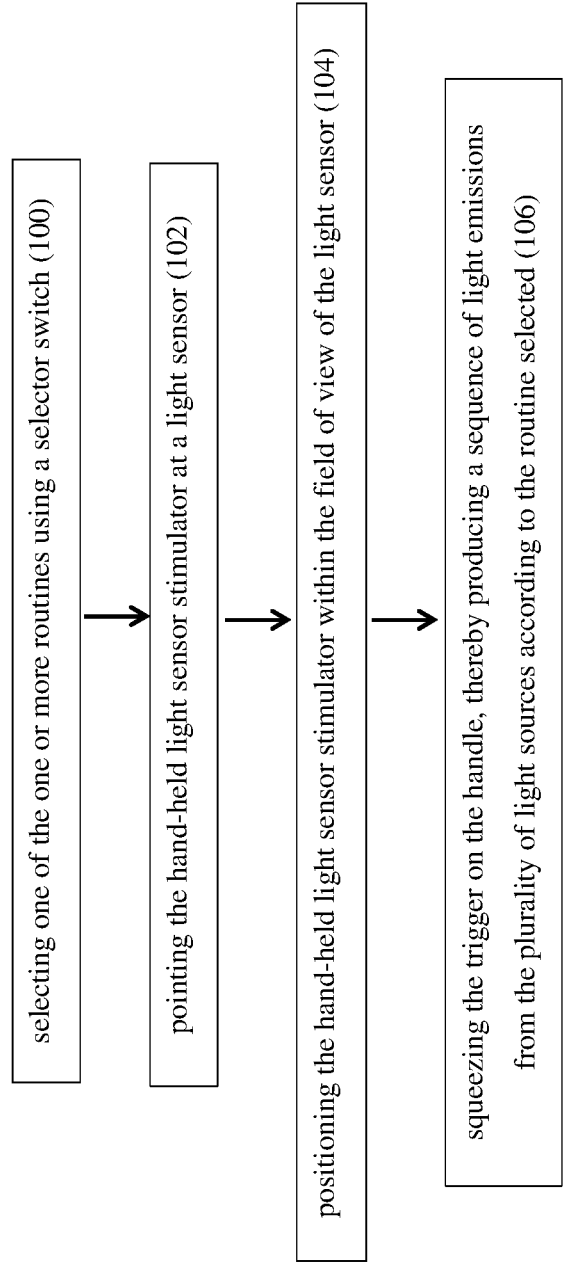
FIG. 5 is a flow chart of one embodiment of a method according to the principles of the present disclosure.

Referring to FIG. 5, a flow chart of one embodiment of a method according to the principles of the present disclosure is shown. More specifically, to use an embodiment of the hand-held UV stimulator of the present disclosure one must select one of the one or more routines using a selector switch 100. Then, by pointing the hand-held light sensor stimulator at a light sensor 102 and positioning the hand-held light sensor stimulator within the field of view of the light sensor 104 a test of the UV sensor and or the system containing the UV sensor can begin by squeezing the trigger on the handle, thereby producing a sequence of light emissions from the plurality of light sources according to the routine selected 106.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A hand-held light sensor stimulator, comprising:
  a handle having a trigger;
  a hollow cylindrical support configured to support a plurality of arcuate light source mounts, each light source mount housing a light source; and
  a control box attached to the handle and to the hollow support, the control box comprising:
    a power source; and a memory for storing one or more routines used to operate a plurality of light sources;

wherein each light source comprises a microcontroller for controlling the intensity and duration of light emitted from each light source according to the one or more routines stored in the memory of the light source stimulator.

2. The hand-held light sensor stimulator according to claim 1, wherein the light sources are UV sources.

3. The hand-held light sensor stimulator according to claim 2, wherein the one or more routines are used to operate the UV sources to replicate a threat signature for use in testing a system using UV sensors as part of system integration, field and/or flight line testing, and/or lab testing.

4. The hand-held light sensor stimulator according to claim 1, further comprising indicator lights.

5. The hand-held light sensor stimulator according to claim 1, further comprising a serial connection for use in uploading the one or more routines to the memory.

6. A method of testing a light sensor system, comprising:
providing a hand-held light sensor stimulator, comprising:
a handle having a trigger;
a hollow cylindrical support configured to support a plurality of arcuate light source mounts, each light source mount housing a light source; and
a control box attached to the handle and to the hollow support, the control box comprising:
a power source; and
a memory for storing one or more routines used to operate a plurality of light sources;
wherein each light source comprises a microcontroller for controlling the intensity and duration of light emitted from each light source according to the one or more routines stored in the memory of the light source stimulator;
selecting one of the one or more routines using a selector switch;
pointing the hand-held light sensor stimulator at a light sensor;
positioning the hand-held light sensor stimulator within the field of view of the light sensor; and
squeezing the trigger on the handle, thereby producing a sequence of light emissions from the plurality of light sources according to the routine selected.

7. The method of testing a light sensor system according to claim 6, wherein the light sources are UV sources.

8. The method of testing a light sensor system according to claim 6, further comprising uploading the one or more routines to the memory using a serial connection.

9. The method of testing a light sensor system according to claim 6, further comprising collecting data from the sensor or a system comprising the sensor as part of system integration, field and/or flight line testing, and/or lab testing.

10. The method of testing a light sensor system according to claim 6, wherein the selected routine represents a threat signature.

11. The method of testing a light sensor system according to claim 6, wherein the selected routine is a simulated signature mimicing movement across the sensor field of view without needing to move the hand-held light sensor stimulator.

* * * * *